United States Patent [19]

Koketsu

[11] 4,113,365

[45] Sep. 12, 1978

[54] SPECTACLES' FRAME WITH VERTICALLY ADJUSTABLE NOSE PADS

[76] Inventor: Sotoichi Koketsu, 13 Fukigecko 6-chome, Gifu-ski, Gifu-Ken 500 Japan

[21] Appl. No.: 688,480

[22] Filed: May 20, 1976

[51] Int. Cl.² .......................... G02C 7/06; G02C 5/12
[52] U.S. Cl. ...................................... 351/128; 351/55; 351/137
[58] Field of Search ................. 351/55, 128, 137, 140, 351/130, 132, 19

[56] References Cited

U.S. PATENT DOCUMENTS 2,660,924   12/1953   Stegeman ............................... 351/55

*Primary Examiner*—Paul A. Sacher
*Assistant Examiner*—Rodney B. Bovernick
*Attorney, Agent, or Firm*—Haseltine, Lake, & Waters

[57] ABSTRACT

This invention relates to spectacles' frame wherein its wearing position relative to the face of the user can be adjusted accurately by moving the nose pads vertically. When this frame is used for spectacles embodying multifocal lenses, including the portions for long distance viewing and the portions for near distance viewing, its wearing position can be changed upwardly so that the portions for near distance viewing are in alignment with the eyes of the user, thereby to afford the user longtime viewing with reduced fatigue. When the said frame is used for spectacles with monofocal lenses, its wearing position can be adjusted upwardly or downwardly so that the focal points of lenses are in correct alignment with the eyes of the user.

2 Claims, 10 Drawing Figures

SPECTACLES' FRAME WITH VERTICALLY ADJUSTABLE NOSE PADS

BACKGROUND OF THE INVENTION

Hitherto, multifocal lenses including the upper portion for long distance viewing and the lower portion for near distance viewing have been in use. Spectacles embodying such multifocal lenses are mostly worn by middle- and old-aged persons. Wearers of such spectacles view the distance through the portions for long distance viewing but use the portions for near distance viewing for reading or writing. As the portions for near distance viewing are in the lower half of the lenses, the user must work his ocular muscles to turn down his eyeballs when viewing through the said portions of lenses. Holding the eyes under this condition for a long time tires the muscles of eyes or eyelids and is not desirable for the health of eyes.

The height of the nose on which a pair of spectacles with monofocal lenses rests differs from person to person. If a spectacles' frame with nose pads fixed to the back of the encircling portions of the frame is worn, therefore, the focal points of lenses are not necessarily in alignment with the eyes. In summer, physiological grease or sweat comes out on the upper nose area where the pads are in contact, causing the frame to slide down from the optimum wearing position.

BRIEF SUMMARY OF THE INVENTION

The first object of the invention is to eliminate the drawbacks of conventional frames, i.e. to provide a spectacles' frame wherein the nose pads are moved up or down to adjust the wearing position of the frame vertically as required when the user of spectacles with multifocal lenses views through the portions for long distance viewing or through the portions for near distance viewing.

The second object of the invention is to minimize the fatigue of the muscles of eyes or eyelids by changing the wearing position of the frame vertically when viewing through the portions for near distance viewing for a long time.

The third object of the invention is to ensure optimum viewing by changing the wearing position of a frame downward when the wearer wants to view through the portions for long distance viewing.

The fourth object of the invention is to prevent a frame of spectacles with monofocal lenses from sliding down due to the difference in the height of the nose of the wearer or physiological phenomena.

The fifth object of the invention is to maintain the changed wearing position of a frame securely without changing the distance between the left and right nose pads when the pads are moved up or down to change the wearing position vertically.

The sixth object of the invention is to provide a spectacles' frame which can be operated easily and quickly.

The seventh object of the invention is to provide a spectacles' frame which is attractive in appearance, simple in construction, easy in manufacture and permits the above-mentioned operations.

These objects can be achieved by elements constituting this invention, improvements, combinations and operations. The embodiments of the invention will be cited with reference to the accompanying drawings and detailed description of the invention given below.

BRIEF DESCRIPTION OF THE DRAWING

FIGS. 1 through 4 show the first embodiment of the invention, in which:

FIG. 1 is a perspective view of a spectacles' frame according to this invention;

FIG. 2 shows an enlarged disassembled view of the principal elements of the frame in perspective from the back side;

FIG. 3 is an enlarged cross-sectional view taken along the line IV—IV of FIG. 1, showing the condition where a lifting member and nose pad are raised; and FIG. 4 is an enlarged cross-sectional view through the line IV—IV of FIG. 1, showing the condition where the lifting member is lowered.

FIGS. 5 through 9 are explanatory drawings of the second embodiment of the invention, in which:

FIG. 5 shows in perspective a spectacles' frame according to this invention;

FIG. 6 is an enlarged disassembled view of the principal elements of the invention in perspective from the back side;

FIG. 7 is an enlarged disassembled view of a box member and a nose pad;

FIG. 8 is an enlarged rear view of the principal elements, showing the condition where a lifting plate is raised up to the position of a bridge to lift the nose pads; and FIG. 9 is an enlarged rear view of the principal elements, showing the condition where both the lifting plate and nose pads are lowered.

DETAILED DESCRIPTION OF THE INVENTION

Figure 1:
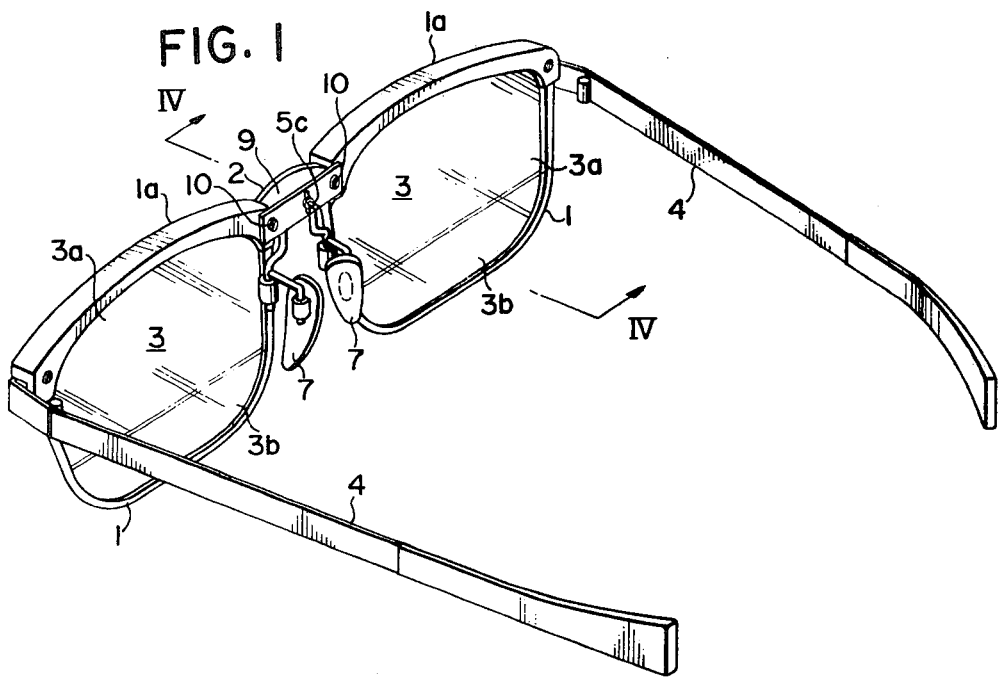
Figure 2:
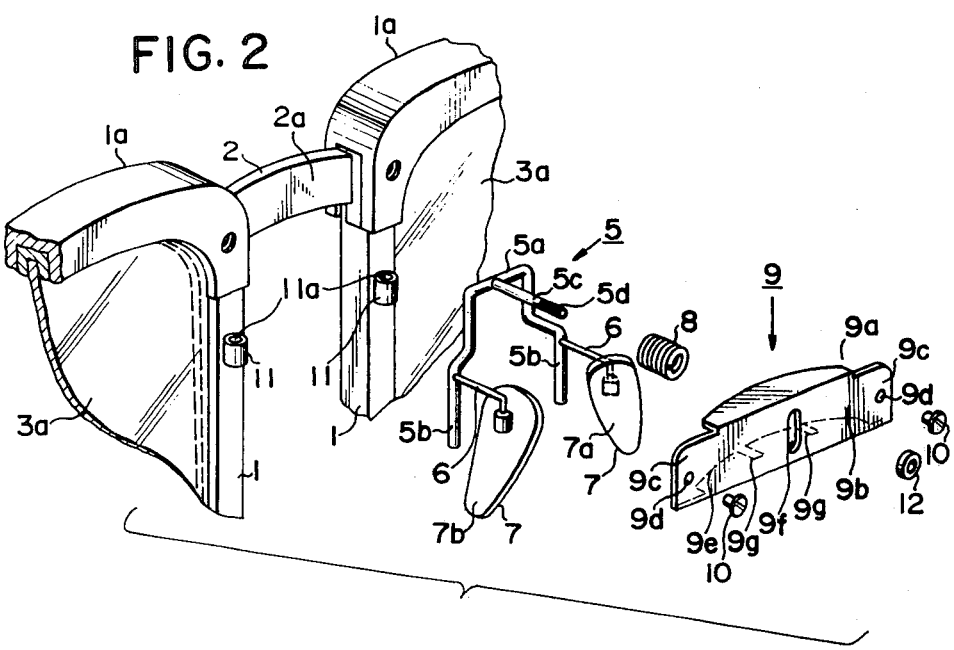

The spectacles' frame according to this invention comprises left and right encircling portions 1, a bridge 2 connecting said encircling portions 1, lenses 3 consisting of upper portions 3a for long distance viewing and lower portions 3b for near distance viewing, left and right bows 4, and a lifting member attached to said bridge 2. Referring to the first embodiment, the numeral 5 defines a lifting member which is of the arched shape as shown in FIG. 2. This member is made from wire or the like material having an appropriate strength. Said member consists of a base 5a and left and right legs 5b which are formed by bending the both sides of the base 5a downwardly. At the center of the base 5a, a lever 5c is provided horizontally in the direction at right angles to the base 5a. The rear end of the lever 5c is provided with threads 5d to which a nut 12 is screwed to serve for holding and clamping.

Figure 3:
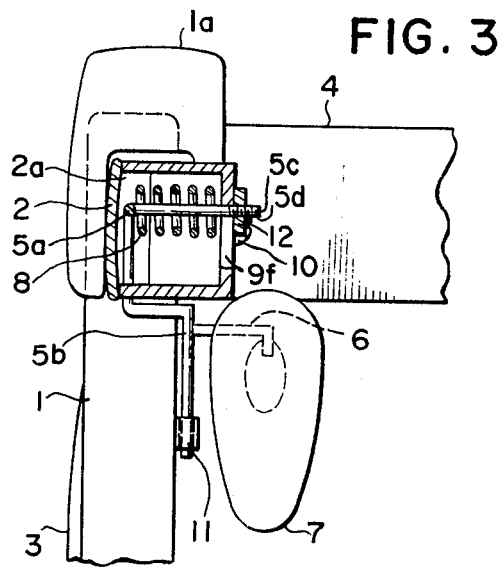
Figure 4:
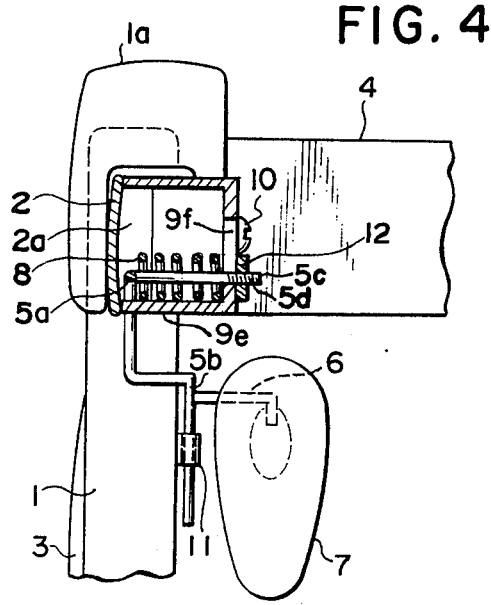
Figure 5:
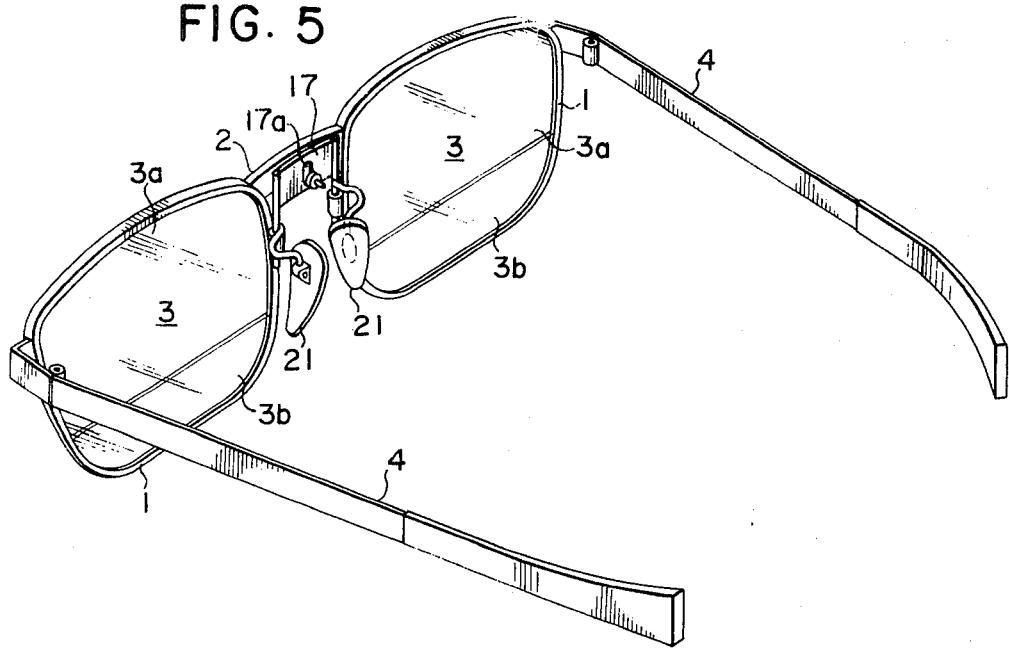

The front ends of arms 6 are fixed to the left and right legs 5b, and the rear ends thereof are secured to rear surfaces 7b of nose pads 7. The numeral 8 defines a coiled spring which is set to the lever 5c. Said spring 8 is resilient outwardly. The numeral 9 indicates a cover that is installed on the back 2a of the bridge 2 to cover the lifting member 5 and spring 8 attached to the back 2a of the bridge 2. The cover 9 consists of an upper wall 9a, a rear wall 9b and a lower wall 9e which are assembled in a U-shape in cross section so as to cover the lifting member and spring. As screw holes 9d are provided at the both ends of the rear wall 9b, elastic members 9c are connected. The lever 5c projects through the cover 9 at its center, and a long hole 9f is made in the cover 9 to permit the vertical movement of the lever 5c. Further, the front edges of the upper wall 9a and lower wall 9e are formed with the same curvature as that of the back 2a of the bridge 2 so that they are brought into close contact with each other. The lower wall 9e is provided with notches 9g on the both sides so that the leg members 5b fitted thereinto can move up and down as the lifting member 5 moves vertically. As shown in FIG. 3, the base 5a of the lifting member 5 is brought into close contact with the back 2a of the bridge 2 so that the lever 5c turns toward the back of the frame and the legs 5b turn downward. The spring 8 is fitted to the lever 5c. The cover 9 is placed on the back 2a of the bridge 2 so that the rear portion of the lever 5c projects through the long hole 9f of the cover 9, overcoming the resilient force of the spring 8, and the legs 5b are inserted into the notches 9g. At this time, the left and right elastic members 9c of the rear wall 9b are fixed to the encircling portions 1 or decorative rim 1a by contacting them to the rear side of the decorative rim 1a and inserting a screw 10 into the screw hole 9d. Thus, part of the lifting member 5 is housed in the area confined by the bridge 2 and the cover 9. The legs 5b projecting downwardly through the notches 9g pass through guide holes 11a made in guides 11. These guides 11 are secured to the encircling portions 1 at a position below the bridge.

The operation of the first embodiment will be described. The rear end of the lever 5c is lowered along the long hole 9f, gripping it between fingers. At this time, the base 5a fixed to the front end of the lever 5c is also lowered. At the same time, the legs 5b are lowered through the notches 9g of the cover 9. Together with such movements, the nose pads 7 secured to the legs 5b by the arms 6 are caused to lower. When wearing a spectacles' frame, however, the positions of the nose pads in contact with the wearer's nose are not changed. When the lever is moved downward as described above, therefore, the encircling portions of the frame are raised relative to the face of the user. When a spectacles' frame with bifocal lenses is worn, the portions 3b for near distance viewing are raised toward the eyes. When a frame with monofocal lenses is worn, or when the upper nose area of the wearer is low and the lowering of the encircling portions of the frame is expected as the nose pads slip down due to the grease or sweat generated at the upper nose area, the nose pads are lowered by means of the lever. In such cases, the encircling portions of the frame are raised relative to the face of the user so that the focal points of the lenses are in alignment with the eyes. When the nose pads are displaced upward by moving the lever upward, the encircling portions of the frame are displaced downward relative to the face. As the one end of the spring 8 set to the lever 5c in the compressed condition is in contact with the inside of the cover 9, the base 5a of the lifting member 5 to which the front end of the lever 5c is fixed is pressed against the back 2a of the bridge 2 by the action of the spring 8. Accordingly, the lifting member 5 moves up or down smoothly along the back 2a of the bridge 2 without shaking when the lever 5c is moved vertically.

Figure 6:
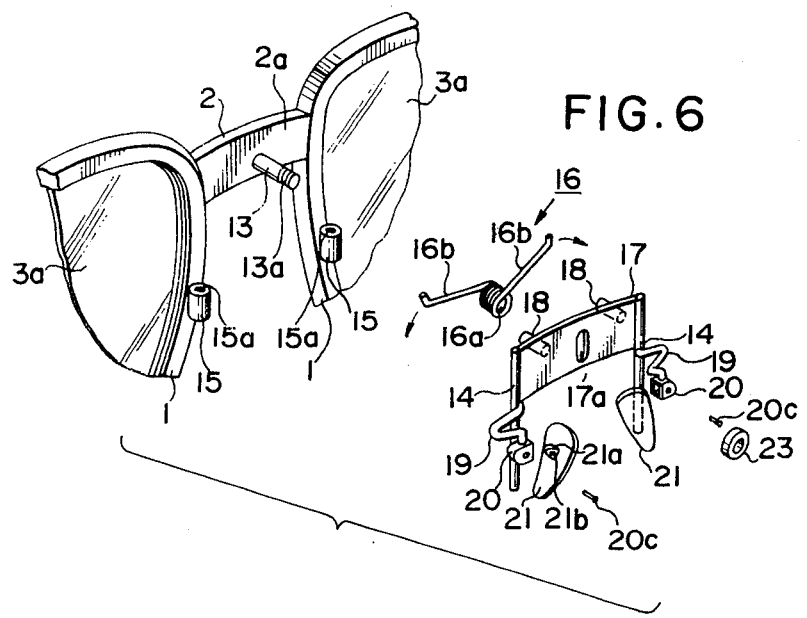
Figure 7:
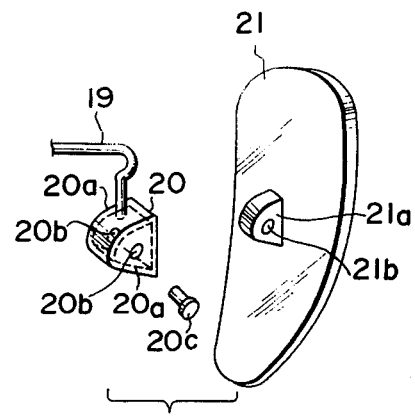
Figure 8:
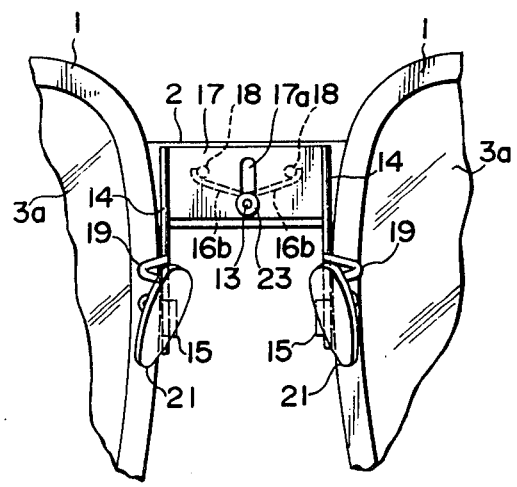
Figure 9:
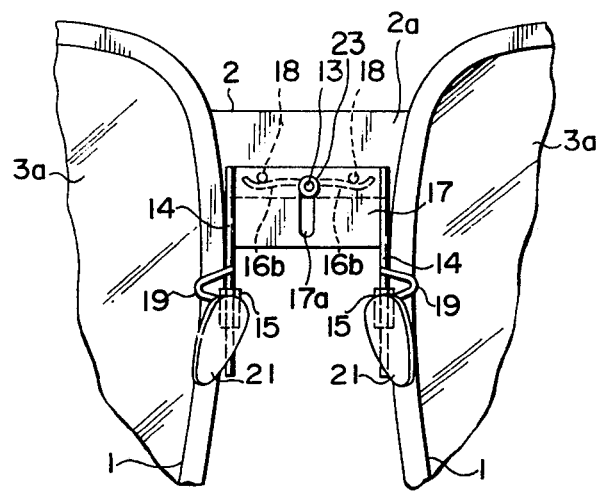

Next, the construction of the second embodiment will be described. The back 2a of the bridge 2 is provided with a horizontal projection 13 backward in its center at a slightly lower position. The rear end of this projection 13 is provided with threads 13a. Guides 15 with a guide hole 15a for guiding the up-and-down movements of left and right legs 14 are secured to the encircling portions 1 of a frame at the positions below the bridge. The numeral 16 indicates a spring, whose center is looped to form a ring 16a. The both ends of the spring 16 are extended in a V-shape to form elastic portions 16b. The elastic portions 16b are made elastic outwardly as shown by the arrow in FIG. 6. When attaching this spring 16 to the back 2a of the bridge 2, the ring portion 16a is fitted to the projection 13 so that the left and right elastic portions 16b form a V-shape. The numeral 17 defines a lifting plate, in which a vertically long hole 17a is made in its center. At the inner face of the lifting plate 17 (the face confronting the back 2a of the bridge 2), engaging projections 18 are provided close to the upper edge symmetrically with the said long hole 17a as the center. The ends of the elastic portions 16b of the spring 16 fitted to the projections 13 are brought into contact with the lower side of the projections 18 to be engaged thereat. Furthermore, legs 14 are installed downwardly at the both ends of the lifting plate 17. The rear ends of arms 19 turned toward the nose are secured to the legs 14 at appropriate positions. Small boxes 20 which are empty and provided with a screw hole 20b at its side wall 20a are fixed to the ends of the arms 19. The numeral 21 indicates a nose pad, to the back of which a projecting piece 21a is fixed. A screw hole 21b is made in this projecting piece 21a. The projecting piece 21a is inserted into the box 20. The nose pad 21 is attached to the arm 19 by inserting a screw 20c into the screw hole 20b. The lifting plate 17 with the nose pads 21 attached is placed over the back 2a of the bridge 2 so that the projection 13 projects into the long hole 17a. On the other hand, the legs 14 are movably inserted into the guide holes 15a of the guides 15. A nut 23 is placed on the threads 13a at the rear end of the projection 13. Thus, the nose pads 21 are movably installed at the rear sides of the encircling portions of the frame.

The operation of the second embodiment will be described.

The engaging projections 18 of the lifting plate 17 are always pushed upward by the resilient force of the left and right elastic portions 16b of the spring 16 provided at the back 2a of the bridge 2, thus keeping the lifting plate 17 in an overlapped condition with the bridge 2. In the case of a spectacles' frame with bifocal lenses, the wearer is viewing through the portions for long distance viewing under the above-mentioned condition. When the lifting plate 17 is pushed down by a finger, overcoming the resilient force of the spring, the lifting plate 17 is lowered in the range of the length of the long hole 17a made therein. Under this condition, the legs 14 attached to the lifting plate 17 and the nose pads 21 are also lowered. When a spectacles' frame is worn under this condition, the encircling portions of the frame are at a raised position relative to the face as compared with their position at the time when the lifting plate 17 is overlapped with the bridge 2 and the nose pads are at an upper position. If the nut 23 is tightened, the lifting plate 17 is fixedly pressed against the bridge 2. When the nut 23 is loosened, the engaging projections 18 are pushed up by the resilient force (righting moment) of the left and right elastic portions 16b of the spring 16. Accordingly, the lifting plate 17 is automatically raised. At the same time, the legs 14 and the nose pads 21 are also raised to the initial position. The long hole 17a made in the lifting plate 17 serves as a guide path along the projection 13. Since the nut 23 is attached to the rear end of the projection 13, the lifting plate 17 will not come off. As the lower portions of the legs 14 are inserted into the guides 15 so that they can be moved in the vertical direction only, they are operated without jarring in the horizontal direction. Therefore, the lifting plate and nose pads can be moved up and down smoothly.

The advantages of this invention will be described in detail.

Figure 10:
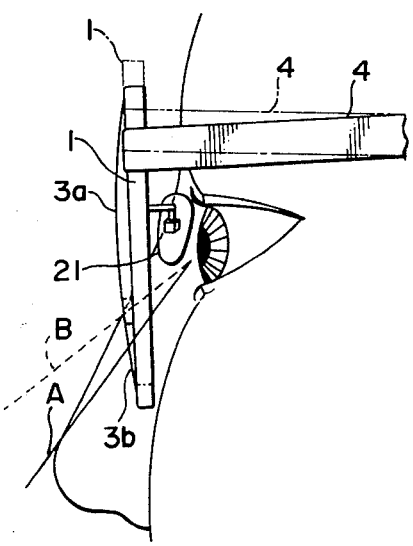
FIG. 10 is a side view showing a spectacles' frame according to this invention is worn on the face wherein continuous lines show the viewing condition through the portion of a lens for long distance viewing and phantom lines show an encircling portion of a frame is raised relative to the face of the user by lowering a nose pad to permit viewing through the portions for near distance viewing.

As described previously, the nose pads on the both sides can be moved vertically by moving the lever 5c in the case of the first embodiment but the lifting plate 17 in the case of the second embodiment. Accordingly, when the wearer of a pair of spectacles with bifocal lenses wants to view through the lens portions for long distance viewing, he can view under the optimum condition by lowering the nose pads so that the portions for long distance viewing are in alignment with his eyes. When this wearer wants to view through the portions for near distance viewing, he lowers the lever or lifting plate to lower the nose pads. In such cases, the position where the nose pads come into contact with the nose is not changed, and therefore the spectacles' frame is raised relative to the face by the length corresponding to the length by which the nose pads have been lowered. Thus, the portions 3b for near distance viewing are moved closer to the eyes as shown in FIG. 10. Accordingly, the angle by which the eyes are turned downward to set the eyes to the portions 3b for near distance viewing is considerably decreased. Thus, the line of sight required in this case is as shown by B in dotted lines. This line of sight is easier for the user as compared with the line of sight A shown in solid lines for usual cases. Therefore, the burden placed on the muscles to turn eyes downward or the burden placed on the nerves for concentration will be greatly reduced. The fatigue to be felt by viewing for a long time can be drastically reduced as compared with that in conventional cases. As a result, the wearer can view for a long time through the portions for near distance viewing, which is very desirable from the standpoint of the health of the eyes.

If an ordinary spectacles' frame with monofocal lenses slips down due to the difference in the height of the nose of the wearer or due to the grease or sweat produced at the upper nose area, the position of the frame can be adjusted by moving up the nose pads. This adjustment brings the lenses into alignment with the eyes and maintains the optimum position of spectacles' frame relative to the eyes at all times, producing good results for the health of the eyes.

As the mechanism according to this invention is installed at the back of the bridge, it is invisible from outside. Therefore, this mechanism does not spoil the appearance of spectacles' frame.

It is to be understood that various changes and modifications of the details of the construction of spectacles' frame according to this invention may be made without departing from the spirit and scope of the invention, and it is intended therefore to cover all such changes and modifications in the appended claims.

What is claimed is:

1. A spectacle frame comprising: a pair of encircling portions for the insertion of lenses therein; a bridge connecting said encircling portions; a pair of bows; a lifting member movable at the back of said bridge; and a pair of vertically adjustable nose pads at lower ends of said lifting member; a lifting member being further defined by legs turning downwardly on both sides of a base having said nose pads attached to said legs by arms; said base having a horizontal lever at its center, and extending rearwardly therefrom, said lever being provided with threads; a spring fitted to said lever; guides fixed to the back of said encircling portions below said bridge employing means defining a guide hole for inserting lower portions of said legs for vertical movement; a cover having a bottom wall affixed to said encircling portions at respective end portions, having a vertically elongated means defining a hole adapted to receive said lever therethrough; notches symmetrically formed on the bottom wall of said cover for receiving said legs; said cover lodging said lifting member and part of said spring; and fastening means positionable around said threads.

2. A spectacle frame as claimed in claim 1, wherein: a lifting member being defined by a horizontal projection installed at the center of said bridge at a position close to a lower edge; rear portions of said projection being provided with threads; a spring having a ring portion including a loop in the center thereof and outwardly resilient elastic portions formed by extensions at both ends of said spring, said elastic portions being disposed to turn upwardly obliquely; lower portions of said legs being movably insertable into means defining guide holes in guides secured to said bridge at positions below the latter; and said lifting plate being disposed to overlap said back of the bridge to pass said projection through said elongated means defining a hole.

* * * * *